US011196970B2

(12) United States Patent
Ramanath

(10) Patent No.: US 11,196,970 B2
(45) Date of Patent: Dec. 7, 2021

(54) ADAPTIVE ILLUMINATOR SEQUENCING

(71) Applicant: Snap Inc., Santa Monica, CA (US)

(72) Inventor: Rajeev Ramanath, Torrance, CA (US)

(73) Assignee: Snap Inc., Santa Monica, CA (US)

( * ) Notice: Subject to any disclaimer, the term of this patent is extended or adjusted under 35 U.S.C. 154(b) by 176 days.

(21) Appl. No.: 16/710,996

(22) Filed: Dec. 11, 2019

(65) Prior Publication Data

US 2020/0204768 A1  Jun. 25, 2020

Related U.S. Application Data

(60) Provisional application No. 62/783,328, filed on Dec. 21, 2018.

(51) Int. Cl.
*H04N 9/31* (2006.01)

(52) U.S. Cl.
CPC ......... *H04N 9/3155* (2013.01); *H04N 9/3126* (2013.01); *H04N 9/3164* (2013.01); *H04N 9/3179* (2013.01); *H04N 9/3194* (2013.01); *H04N 9/3144* (2013.01)

(58) Field of Classification Search
None
See application file for complete search history.

(56) References Cited

U.S. PATENT DOCUMENTS

| 6,724,354 | B1 | 4/2004 | Spitzer et al. |
| 10,935,815 | B1* | 3/2021 | Castaneda ........... F21V 23/0478 |
| 2017/0280094 | A1 | 9/2017 | Ito et al. |

OTHER PUBLICATIONS

International Search Report and Written Opinion for International Application No. PCT/US2019/065749, dated Mar. 2, 2020 (Mar. 2, 2020)—15 pages.

* cited by examiner

*Primary Examiner* — Samira Monshi
(74) *Attorney, Agent, or Firm* — Culhane Meadows PLLC; Stephen J. Weed

(57) ABSTRACT

An eyewear device is disclosed including an illumination device including illumination sources, each illumination source including a first illuminator, a second illuminator, and a third illuminator, and a spatial light modulator coupled to the illumination device to control when each of the first, second, and third illuminators are on during an illumination frame. The spatial light modulator is adapted to turn on the first illuminator while the second and third illuminators are off, turn on the second illuminator while the first and third illuminators are off, turn on the third illuminator while the first and second illuminators are off during a third time period of the illumination frame, and turn on the first, second and third illuminators during a fourth time period. An illumination method is also disclosed.

20 Claims, 5 Drawing Sheets

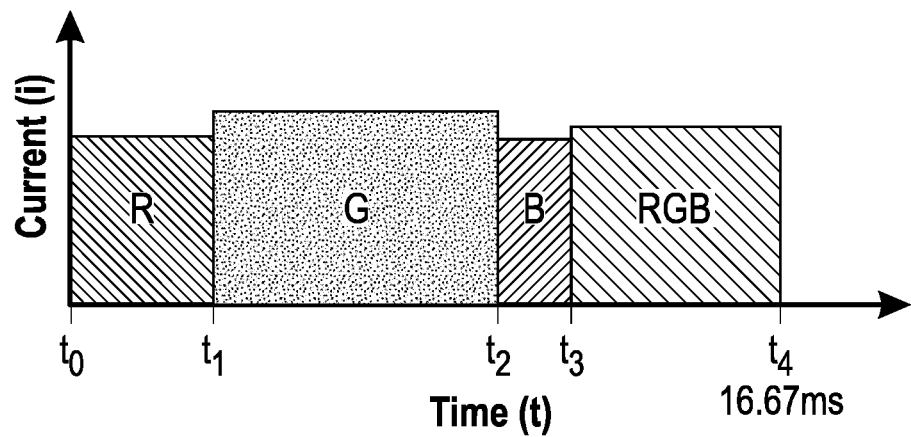
FIG. 4A
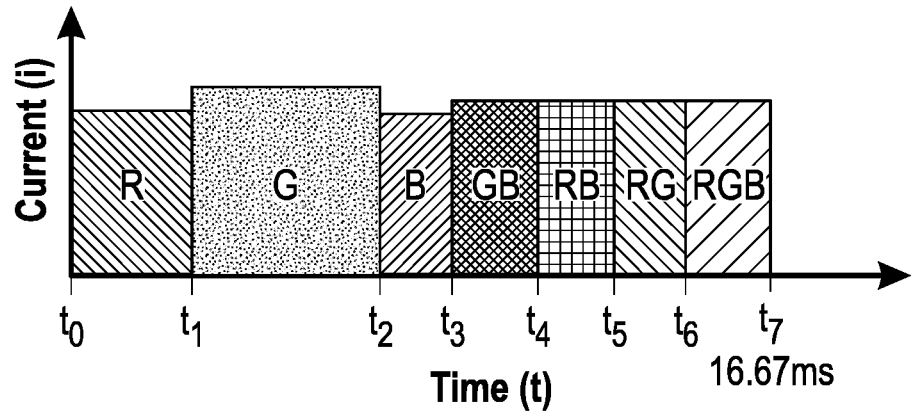
FIG. 4B
$$\begin{pmatrix} X_R & X_G & X_B & X_C & X_M & X_Y & X_W \\ Y_R & Y_G & Y_B & Y_C & Y_M & Y_Y & Y_W \\ Z_R & Z_G & Z_B & Z_C & Z_M & Z_Y & Z_W \end{pmatrix} \begin{pmatrix} i_R & 0 & 0 & 0 & 0 & 0 & 0 \\ 0 & i_G & 0 & 0 & 0 & 0 & 0 \\ 0 & 0 & i_B & 0 & 0 & 0 & 0 \\ 0 & 0 & 0 & i_C & 0 & 0 & 0 \\ 0 & 0 & 0 & 0 & i_M & 0 & 0 \\ 0 & 0 & 0 & 0 & 0 & i_Y & 0 \\ 0 & 0 & 0 & 0 & 0 & 0 & i_W \end{pmatrix} \begin{pmatrix} t_R \\ t_G \\ t_B \\ t_C \\ t_M \\ t_Y \\ t_W \end{pmatrix} = \begin{pmatrix} X \\ Y \\ Z \end{pmatrix}$$
White
FIG. 5

ADAPTIVE ILLUMINATOR SEQUENCING

CROSS-REFERENCE TO RELATED APPLICATIONS

This application claims priority to U.S. Provisional Application Ser. No. 62/783,328 entitled ADAPTIVE ILLUMINATOR SEQUENCING, filed on Dec. 21, 2018, the contents of which are incorporated fully herein by reference.

FIELD OF THE INVENTION

The present invention relates to light projectors and, more particularly, to projectors with adaptive illuminators.

BACKGROUND OF THE INVENTION

Consumer electronics devices utilize projectors to display images to their users. The projectors include illuminators such as LEDs to create light for displaying the images. In environments where the ambient level of light is high, the projectors may increase the current to the illuminators to boost brightness in order to improve visibility. Increasing the current to the illuminators, however, causes the illuminators to generate heat, which limits the usefulness of such an approach.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 4A is a timing diagram for implementation of a four color scheme in the eyewear device of FIG. 1;

FIG. 4B is a timing diagram for implementation of a seven color scheme in the eyewear device of FIG. 1;

FIG. 5 is an equations for determining current and timing requirements to produce the color white;

DETAILED DESCRIPTION OF THE INVENTION

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. As used herein, the term lens covers transparent or translucent pieces of glass or plastic having curved and/or flat surfaces that cause light to converge/diverge or that cause little or no convergence/divergence. The term "about" as used herein refers to a range of values surrounding an actual value, i.e., +/−10%.

The orientations of an eyewear device, associated components and any complete devices as shown in any of the drawings, are given by way of example only, for illustration and discussion purposes. In operation, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any depth-capturing camera or component of the depth-capturing camera constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Figure 1:
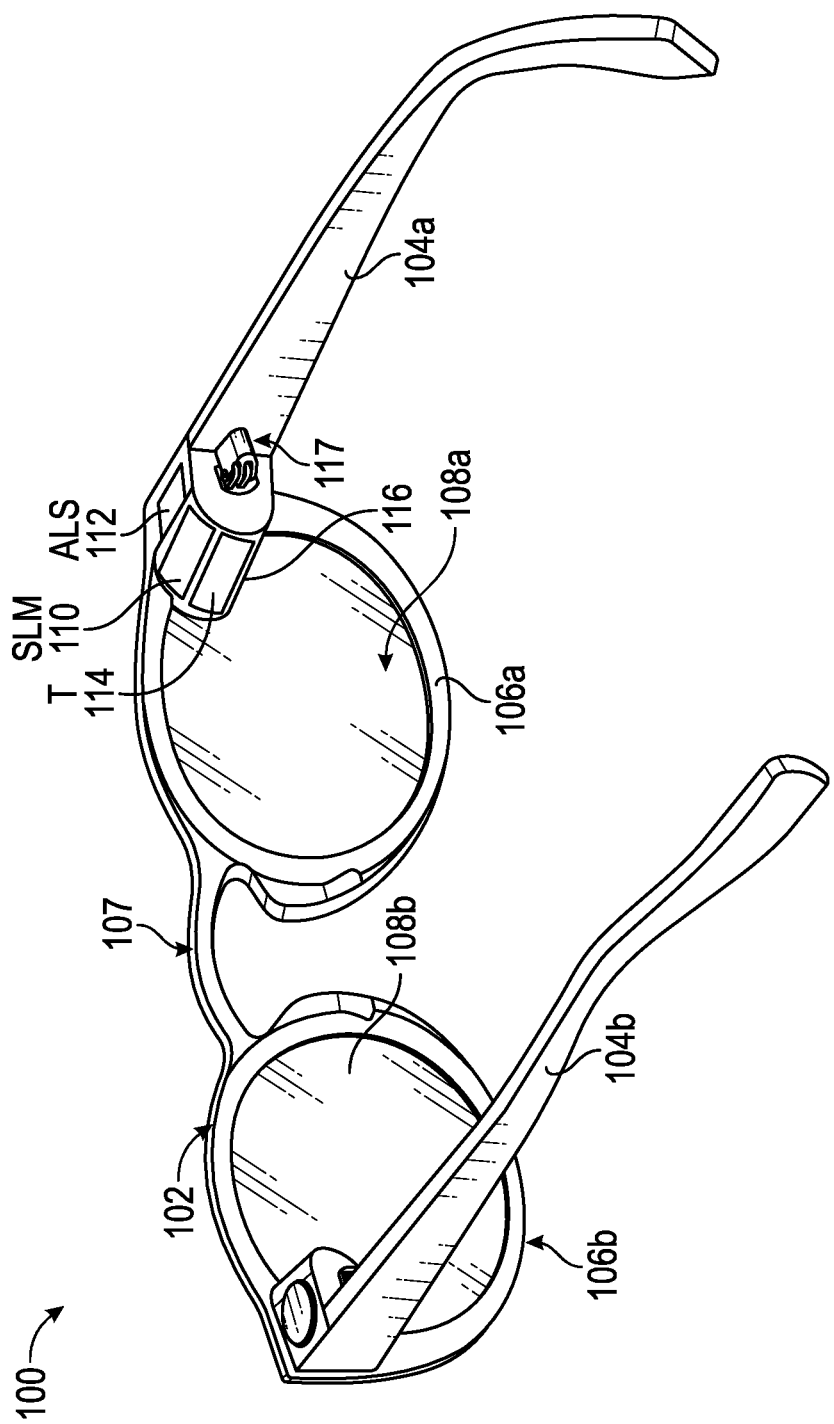
FIG. 1 is a perspective view of an eyewear device.

FIG. 1 depicts an eyewear device 100. Eyewear device 100 includes a support structure that has a frame 102, a right temple 104a, and a left temple 104b. Frame 102 includes a right rim 106a that supports a right lens 108a and left rim 106b that supports a left lens 108b. A bridge 107 connects the left and right rims 106a and 106b and is adapted to receive a nose of the wearer. Eyewear device 100 additionally includes a spatial light modulator (SLM) 110, an ambient light sensor (ALS) 112, and a temperature sensor 114, which will be described in further detail below.

Eyewear device 100 additionally includes an optional chunk 116 between frame 102 and temple 104a to house electronic components. Chunk 116 may be attached to frame 102 or integrated into frame 102. A hinge 117 may connect temple 104a to chunk 116 to enable folding of temple 104a toward frame 102 in a conventional manner. Although an eyewear device example is provided, it is to be understood that the examples described herein may be applied to other electronic devices including color illuminator light sources.

Figure 2:
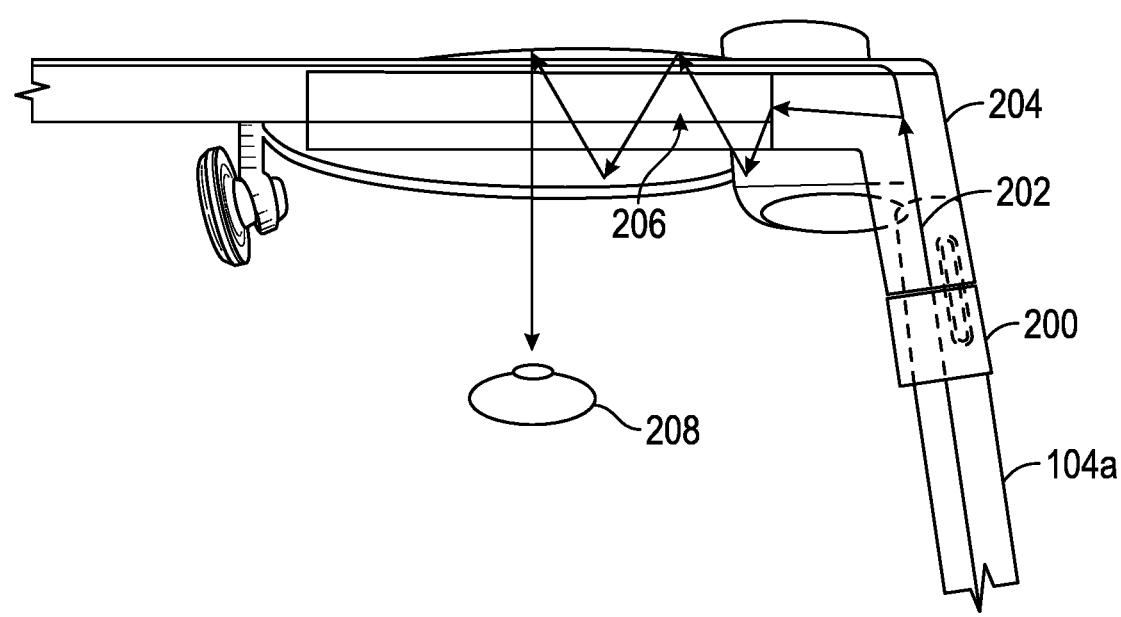
FIG. 2 is a top partial view of the eyewear device of FIG. 1.

FIG. 2 conceptually depicts a portion of eyewear device 100 for use in describing optical characteristics. An illumination device 200 projects beams of light 202 under control of SLM 110 (FIG. 1). Projection optics 204 such as light guides and mirrors direct beams of light 202 into a waveguide 206. In this example, lens 106a defines the waveguide 206. Beams of light 202 are internally reflected by waveguide 206 and exit waveguide 206 at an exit coupler such as a diffractive grating or coating for viewing in a view area by an eye 208 of a wearer of eyewear device 100.

Figure 3:
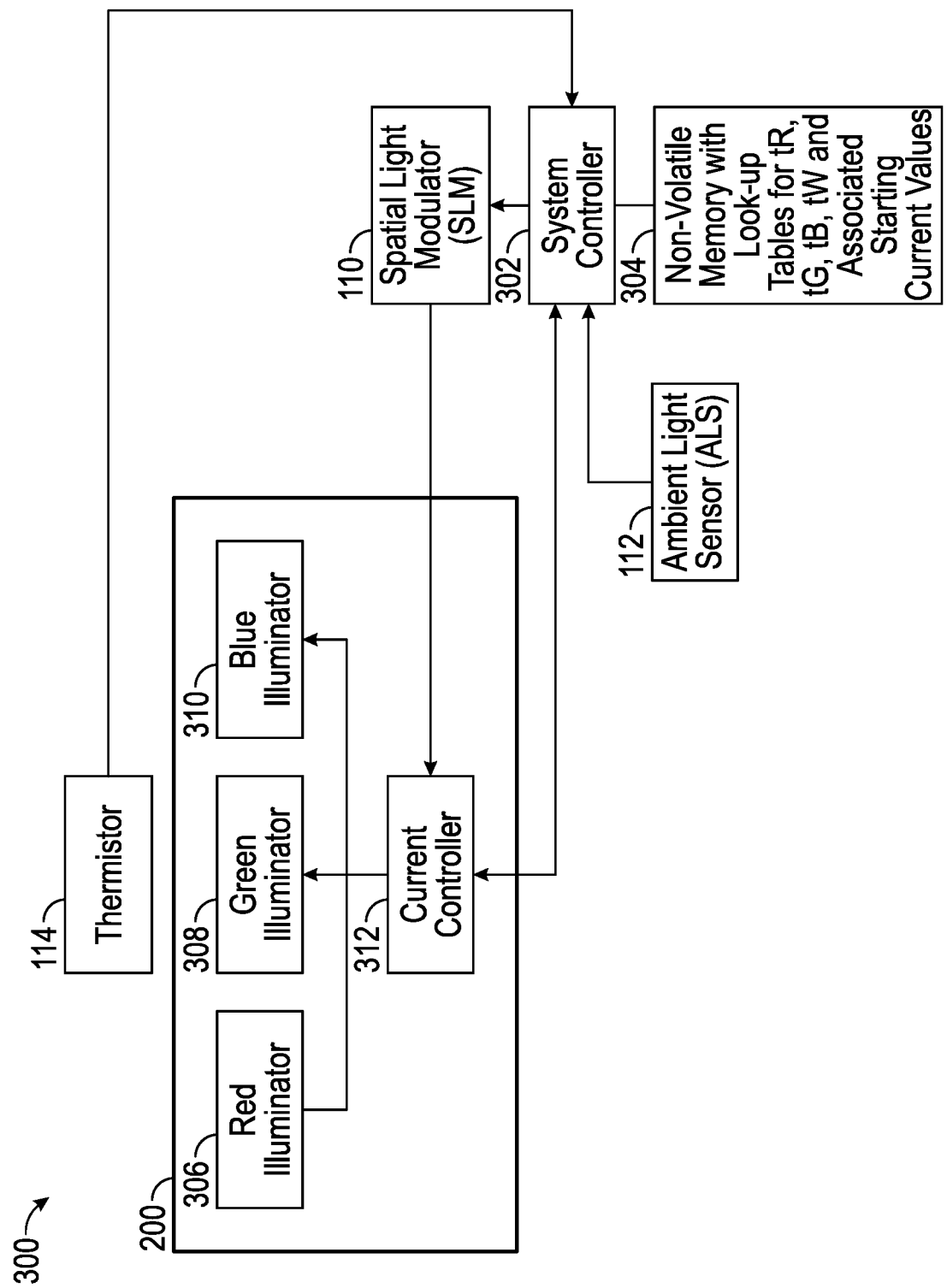
FIG. 3 is a block diagram of hardware components of the eyewear device of FIG. 1.

FIG. 3 depicts hardware components 300 for use in eyewear device 100. In addition to SLM 110, ALS 112, thermistor 114, and illumination device 200 described above, hardware components 300 include a system controller 302, a memory 304, current controller 312, and three illuminators. The three illuminators include a red illuminator 306 such as a red light emitting diode (LED) adapted to emit light at a first frequency associated with the color red, a green illuminator 308 such as a green LED adapted to emit light at a second frequency associated with the color green, and a blue illuminator 310 such as a green LED adapted to emit light at a third frequency associated with the color red. System controller 302 and current controller 312 may each be a microcontroller adapted to implement the functions described herein. Memory 304 may be non-volatile memory such as flash memory or erasable read only memory.

System controller 302 receives temperature values from thermistor 114 and ambient light levels from ALS 112 via transmission lines. System controller retrieves timing information for tuning on the illuminators from memory 304 based on the ambient light levels. System controller 302 also configures SLM 110 and current controller 312 based on ambient light levels and/or temperature to project light beams 202. For example, system controller 302 may configure SLM 110 for high/low brightness in high/low ambient light conditions and may configure current controller 312 to reduce current (e.g., in accordance with current derating curves) if heat generation by the illuminators could damage the device.

FIG. 4A depicts an example timing sequence for a four-color sequence (red, green, blue, white) to depict the color white. The timing sequence is over an illumination sequence of 16.67 ms (representing a 60 Hz frame of video). Because the sequence occurs with a short period of time from the human eye's perspective, the eye of a user interprets the combination of colors as occurring simultaneously rather than the colors individually. In the timing sequence of FIG. 4A, red illuminator (R) 306 is solely illuminated for a duration equal to $t_1$-$t_0$ (20%), green illuminator (G) 308 is solely illuminated for a duration equal to $t_2$-$t_1$ (40%), blue illuminator (B) 310 is solely illuminated for a duration equal to $t_3$-$t_2$ (10%), and all three illuminators (RGB; White; W) 306, 308, and 310 are illuminated for a duration equal to $t_4$-$t_3$ (30%). In a conventional system, the illuminators are not simultaneously lit. In order to increase brightness in such system, current to the illuminators are increased. Illuminating the illuminators simultaneously some of the time in accordance with the timing sequence in FIG. 4A enables more light to be delivered than in conventional system without increasing current. Additionally, the illuminators are still turned off periodically to allow for cooling.

FIG. 4B depicts an example timing sequence for a seven-color sequence (red, green, blue, cyan, magenta, yellow, white) to depict the color white. The timing sequence is over an illumination sequence of 16.67 ms. In the timing sequence of FIG. 4B, red illuminator (R) 306 is solely illuminated for a duration equal to $t_1$-$t_0$ (20%), green illuminator (G) 308 is solely illuminated for a duration equal to $t_2$-$t_1$ (30%), blue illuminator (B) 310 is solely illuminated for a duration equal to $t_3$-$t_2$ (10%), the green illuminator 308 and blue illuminator 310 (GB; Cyan; C) are illuminated for a duration equal to $t_4$-$t_3$ (10%), the red illuminator 306 and blue illuminator 310 (RB; Magenta; M) are illuminated for a duration equal to $t_5$-$t_4$ (10%), the red illuminator 306 and green illuminator 308 (RG; Yellow; Y) are illuminated for a duration equal to $t_6$-$t_5$ (10%), and all three illuminators (RGB; White; W) 306, 308, and 310 are illuminated for a duration equal to $t_7$-$t_6$ (10%). Illuminating the illuminators simultaneously some of the time in accordance with the timing sequence in FIG. 4B enables more light to be delivered than in conventional system without increasing current. Additionally, the illuminators are still turned off periodically to allow for cooling.

In an example, when displaying an overlapping color such as white, the red illuminator 306 is on during both $t_R$ and $t_W$, and off during $t_G$ and $t_B$, the green illuminator 308 is on during both $t_G$ and $t_W$ and off during $t_R$ and $t_B$, and the blue illuminator 310 is on during both $t_B$ and $t_W$, and off during $t_R$ and $t_G$.

In an example, when displaying a non-overlapping color such as red, the red illuminator 306 is on during $t_R$, but is off during $t_W$. In another example, when displaying a non-overlapping color such as red, the red illuminator 306 is on during both $t_R$ and $t_W$ (with the green illuminator 308 and the blue illuminator 310 off during $t_W$).

FIG. 5 depicts an equation for use in determining characteristics such as current and timing values to configure the illuminators in order to produce a desired color white having particular intensity or brightness. Each illuminator has an International Commission on Illumination (CIE) tristimulus value (X, Y, Z), which is a three-dimensional value. An alternative representation of the tristate value is x, y, Y, where x=X/(X+Y+Z), y=Y/X+Y+Z, and Y represents intensity or brightness. The "on" time for each illuminator is represented by "t" and is the duration when the illuminator is on, during which current "i" is supplied to the illuminator. When off, the illuminator cools down thermally. To maintain color points (i.e., chromaticity values), the current (i) supply to each illuminator is set to a constant value. For example, the current value for the red illuminator 306 when showing red, magenta, yellow, and white is constant throughout the timing sequence.

In an example, the system adjusts brightness to address visibility based on ambient light conditions by adapting the duration when all illuminators are on ($t_W$) for a four color system and ($t_W$, $t_C$, $t_M$, and $t_Y$) for a seven color system. There is a direct correlation between system brightness and time duration for overlapping illuminator colors $t_W$ (for a four color system) and $t_W$, $t_C$, $t_M$, and $t_Y$ (for a seven color system). An optimal set of operational parameters (current and duration for each illuminator) are chosen for each system. For example, the eyewear 100 optimizes the SLM 110 to run at a brightness of $Y_0$ for an ambient temperature of $T_0$, a brightness of $Y_1$ for an ambient temperature of $T_1$, and a brightness of $Y_2$ for an ambient temperature of $T_2$. For higher ambient light levels, the duration of the overlapping color(s) is increased to improve visibility. Conversely, for lower ambient light levels, the duration of the overlapping color(s) is decreased to reduce power consumption. When the duration of the overlapping color(s) is high/low, the duration of the non-overlapping colors ($t_R$, $t_G$, and $t_B$) are increased/reduced to compensate for the time in the illumination frame that the overlapping color(s) are not in use.

Determination of the optimal operational parameters takes into account illuminator temperature, e.g., via a thermistor 114 positioned adjacent the illuminator. The positions adjacent the illuminator include areas providing an accurate representation of illuminator temperature (either actual or correlated). Touch temperature on the temple of 104a near (e.g., within half of centimeter) of the illuminators has good correlation with the actual temperature of the illuminators.

Touch temperature may be an operation parameter set at a maximum value of 55 degrees Celsius, as an example.

Conventional systems address bright ambient light conditions by increasing current to the illuminators to increase brightness without adjusting illuminator on duration times, which has limited effectiveness due to thermal limitation of the illuminators. Additionally, such system typically require an active control loop including a color sensor to maintain the system white point due to the non-linear brightness response of illuminators such as LEDs to current increases.

By cycling the illuminators, for example, as taught in FIGS. 4A and 4B, the system can maintain the illuminator temperature in a safe operating range for a longer operational time. Additionally, active control loops such as those found in conventional system can be avoided.

Figure 6:
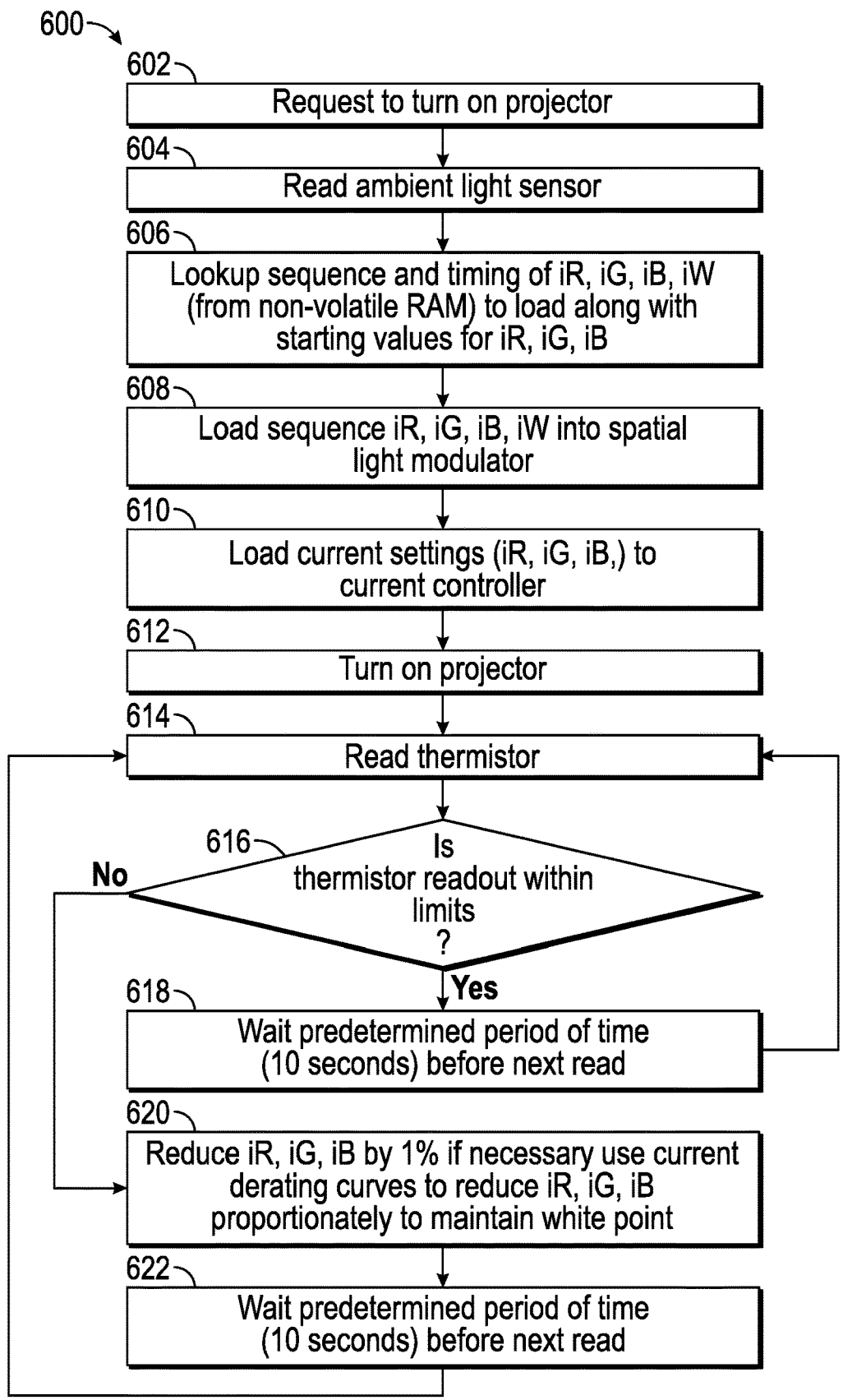
FIG. 6 is a flow chart of steps to project an image with the eyewear device of FIG. 1.

FIG. 6 depicts a flow chart of example steps for use in displaying images by an electronic device such as eyewear 100. Although eyewear device 100 is described in the following example, it is apparent from the description herein that other types of electronic device where illuminators generate light may benefit from implementing the method. Additionally, one of skill in the art will understand suitable modification from the description here such as omission of one or more of the steps and/or performance in a different order.

At step 602, initiate request to turn on the light projector. In an example, the light projector may include SLM 110 and illumination device 200. System controller 302 of eyewear device 100 may initiate the request to turn on SLM 110 and illumination device 200, e.g., in response to an instruction to display information via lens 108a of eyewear device 100.

At step 604, read ambient light sensor. System controller 302 may read an ambient light level by periodically polling ALS 112. ALS 112 may be positioned on eyewear device 100 to provide an accurate reading of the light level the user is experiencing while wearing the eyewear device 100 (or a value with good correlation to the light level).

At step 606, obtain illuminator timing and current settings. System controller 302 may read values from a lookup table in memory 304. The lookup table may include multiple timing entries where each timing entry corresponds to a different ambient light level. In this example, system controller 302 reads the timing values from the lookup table associated with the current ambient light level read from ALS 112. For a four color sequence, the timing sequence includes four timing values ($t_R$, $t_G$, $t_B$, and $t_W$) for each of multiple ambient light level ranges. For a seven color sequence, the timing sequence includes seven timing values ($t_R$, $t_C$, $t_B$, $t_C$, $t_M$, $t_Y$, and $t_W$) for each of multiple ambient light level ranges. The same or a different lookup table may include initial current settings for the illuminators.

At step 608, load the timing sequence into an adaptive spatial light modulator. System controller 302 may load the timing sequence from step 606 into SLM 110, which in turn, controls current controller 312 to selectively switch current on/off to illuminators 306, 308, and 310.

At step 610, load current settings into current controller. System controller 302 may load the current setting from step 606 into SLM 110.

At step 612, turn on the projector. System controller 302 may turn on SLM 110 and current controller 312 after loading timing sequences into SLM 110 and loading current settings into current controller 312.

At step 614, read temperature associated with the projector illuminators. System controller 302 may periodically read the temperature from thermistor 114. The temperature may be an actual temperature of the illuminators from a position in very close proximity or a correlated temperature from a nearby location such as on or near the surface of the temple 104a containing the illuminators (e.g., touch temperature).

At step 616, determine if temperature is within an acceptable range. System controller 302 may compare the periodically read temperature values to acceptable temperature limits (e.g., a threshold value selected below an acceptable touch temperature of 55 degrees Celsius, as an example). If the temperature is acceptable, at step 618, the system waits a predetermined period of time (e.g., 10 seconds) before reading the temperature again. System controller 302 repeats steps 614, 616, and 618 for as long as the temperature from thermistor 114 is below the acceptable range.

At step 620, when the read temperature is not within the acceptable range, current to the illuminators is reduced. System controller 302 may instruct current controller 312 to reduce current by a predetermined amount (e.g., 1% or approximately 1%). Current to the individual illuminators (e.g., $i_R$, $i_G$, and $i_B$) may be reduced proportionally using current derating curves for the individual illuminators in order to maintain the white point of the system.

At step 622, the system waits a predetermined period of time (e.g., 10 seconds) before reading the temperature again. System controller 302 repeats steps 614, 616, 620 and 622 for as long as the temperature from thermistor 114 is at or above the acceptable range.

System controller 302 may additionally adjust timing of illuminators if ambient light levels change while the projector is on. For example, if ambient light levels increase above a predetermined amount (e.g., 5,000 lux), system controller 302 may increase the percentage on time of the overlapping colors (e.g., $t_W$ in a four color system and $t_C$, $t_M$, $t_Y$, and $t_W$ in a seven color system) to improve visibility. Conversely, if ambient light levels decrease below a predetermined amount (e.g., 5,000 lux), system controller 302 may decrease the percentage on time of the overlapping colors (e.g., $t_W$ in a four color system and $t_C$, $t_M$, $t_Y$, and $t_W$ in a seven color system) to reduce power consumption. When the duration of the overlapping color(s) is reduced/increased, the duration of the non-overlapping colors ($t_R$, $t_G$, and $t_B$) may be increased/reduced to compensate for the time in the illumination frame that the overlapping color(s) are no longer in use.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed:

1. An eyewear device comprising:
   a lens defining a waveguide;
   a support structure adapted to be worn on the head of a user, the support structure configured to support the lens in a viewing area visible to the user when wearing the support structure;
   an illumination device including a plurality of illumination sources, each illumination source including a first illuminator adapted to emit light at a first frequency, a second illuminator adapted to emit light at a second frequency, and a third illuminator adapted to emit light at a third frequency, wherein the first, second, and third frequencies are different;
   projection optics configured to project light from the plurality of illumination sources into the waveguide for routing to the viewing area; and
   a spatial light modulator coupled to the illumination device to control when each of the first, second, and third illuminators are on during an illumination frame, the spatial light modulator adapted to turn on the first illuminator while the second and third illuminators are off during a first time period of the illumination frame, turn on the second illuminator while the first and third illuminators are off during a second time period of the illumination frame, turn on the third illuminator while the first and second illuminators are off during a third time period of the illumination frame, and turn on the first, second and third illuminators during a fourth time period of the illumination frame, wherein the first, second, third, and fourth time periods do not overlap.

2. The eyewear device of claim 1, further comprising:
   an ambient light sensor to sense an ambient light level; and
   a controller coupled to the ambient light sensor and the spatial light modulator;
   wherein the spatial light modulator adjusts a duration of the fourth time period responsive to the controller based on the ambient light level.

3. The eyewear device of claim 2, further comprising:
   a temperature sensor positioned adjacent the illumination device to sense temperature;
   wherein the controller is coupled to the temperature sensor and wherein the spatial light modulator adjusts current to at least one of the first, second, or third illuminators responsive to the controller based on the sensed temperature.

4. The eyewear device of claim 2, wherein the controller periodically detects the ambient light level, calculates the fourth period, and loads the calculated fourth period onto the spatial light modulator.

5. The eyewear device of claim 4, wherein the controller increases the fourth time period duration and decreases at least one of the first, second, or third time period durations to compensate for the increase in the fourth time period duration in response to the ambient light level increasing.

6. The eyewear device of claim 4, wherein the controller decreases the fourth time period duration and increases at least one of the first, second, or third time period durations to compensate for the decrease in the fourth time period duration in response to the ambient light level decreasing.

7. The eyewear device of claim 1, wherein the first illuminator is a red light emitting diode (LED), the second illuminator is a green LED, and the third illuminator is a blue LED.

8. The eyewear device of claim 1, wherein the first time period is about 20%, the second time period is about 40%, the third time period is about 10%, and the fourth time period is about 30%.

9. The eyewear device of claim 1, wherein the first, second, and third illuminators are time sequenced over the illumination frame.

10. The eyewear device of claim 1, wherein the spatial light modulator is further adapted to turn on the first and second illuminators while the third illuminator is off during a fifth time period of the illumination frame, turn on the second and third illuminators while the first illuminator is off during a sixth time period of the illumination frame, and turn on the first and third illuminators while the second illuminator is off during a seventh time period of the illumination frame.

11. The eyewear device of claim 10, wherein the first illuminator is turned on by a first current, the second illuminator is turned on by a second current, and the third illuminator is turned on by a third current and wherein the first current is the same during the first, fourth, fifth, and seventh time periods of the illumination frame, the second current is the same during the second, fourth, fifth, and sixth time periods of the illumination frame, and the third current is the same during the third, fourth, sixth, and seventh time periods of the illumination frame.

12. An illumination method comprising:
    determining time periods for illuminating illuminators of illumination sources within an illumination frame, each illumination source includes a first illuminator adapted to emit light at a first frequency, a second illuminator adapted to emit light at a second frequency, and a third illuminator adapted to emit light at a third frequency, wherein the first, second, and third frequencies are different;
    selectively illuminating the first, second, and third illuminators within the illumination frame for the determined time periods, such that the first illuminator is turned on while the second and third illuminators are off during a first time period of the illumination frame, the second illuminator is turned on while the first and third illuminators are off during a second time period of the illumination frame, the third illuminator is turned on while the first and second illuminators are off during a third time period of the illumination frame, and the first, second and third illuminator are turned on during a fourth time period of the illumination frame, wherein the first, second, third, and fourth time periods do not overlap.

13. The illumination method claim 12, wherein the determining step comprises:
    sensing an ambient light level; and
    adjusting a duration of the fourth time period responsive to the controller based on the ambient light level.

14. The illumination method claim 13, wherein the determining step comprises:
    sensing temperature adjacent the illumination sources; and
    adjusting current to at least one of the first, second, or third illuminators responsive to the controller based on the sensed temperature.

15. The illumination method of claim 13, wherein the ambient light level is sensed periodically, the illumination method further comprises calculating the fourth period, and the adjusting step comprises loading the calculated fourth period into a spatial light modulator.

16. The illumination method of claim 15, wherein the fourth time period duration is increased and at least one of the first, second, or third time period durations is decreased to compensate for the increase in the fourth time period duration in response to the ambient light level increasing.

17. The illumination method of claim 15, wherein the fourth time period duration is decreased and at least one of the first, second, or third time period durations is increased to compensate for the decrease in the fourth time period duration in response to the ambient light level decreasing.

18. The illumination method of claim 12, wherein the first time period is about 20%, the second time period is about 40%, the third time period is about 10%, and the fourth time period is about 30%.

19. The illumination method of claim 12, wherein the first, second, and third illuminators are time sequenced over the illumination frame.

20. The illumination method of claim 12, wherein the first, second, and third illuminators are further selectively illuminated within the illumination frame, such that the first and second illuminators are turned on while the third illuminator is off during a fifth time period of the illumination frame, the second and third illuminators are turned on while the first illuminator is off during a sixth time period of the illumination frame, and the first and third illuminators are turned on while the second illuminator is off during a seventh time period of the illumination frame.

* * * * *